(12) United States Patent
King et al.

(10) Patent No.: US 9,593,789 B2
(45) Date of Patent: Mar. 14, 2017

(54) PIPE-FITTING WITH ADAPTOR ASSEMBLY AND RELATED METHODS

(71) Applicants: Thomas A. King, Chesterfield, MO (US); Duane K. Smith, St. Charles, MO (US)

(72) Inventors: Thomas A. King, Chesterfield, MO (US); Duane K. Smith, St. Charles, MO (US)

(73) Assignee: Blazing Products, Inc.

( * ) Notice: Subject to any disclaimer, the term of this patent is extended or adjusted under 35 U.S.C. 154(b) by 807 days.

(21) Appl. No.: 13/656,211

(22) Filed: Oct. 19, 2012

(65) Prior Publication Data

US 2013/0043675 A1     Feb. 21, 2013

Related U.S. Application Data

(63) Continuation-in-part of application No. 12/416,814, filed on Apr. 1, 2009, now abandoned.

(60) Provisional application No. 61/555,801, filed on Nov. 4, 2011.

(51) Int. Cl.
*F16L 37/088*     (2006.01)

(52) U.S. Cl.
CPC ....... *F16L 37/088* (2013.01); *Y10T 29/49716* (2015.01)

(58) Field of Classification Search
USPC ... 285/82–83, 239, 242, 345, 347, 374, 321, 285/308, 307
See application file for complete search history.

(56) References Cited

U.S. PATENT DOCUMENTS

| | | |
|---|---|---|
| 15,846 A | 10/1856 | Ferry |
| 105,818 A | 7/1870 | Lord |
| 224,586 A | 2/1880 | Earle |
| 278,961 A | 6/1883 | Hobbs |
| 484,656 A | 10/1892 | Doolittle |
| 535,880 A | 3/1895 | Anderson |
| 545,066 A | 8/1895 | Fregeau |
| 567,962 A | 9/1896 | Cooper |

(Continued)

OTHER PUBLICATIONS

Olson Irrigation Systems EZ=E11, http://www.olsonirrigation.com/PROD/OISEZEL/OLSezel.html, web page printed Feb. 27, 2007.

(Continued)

*Primary Examiner* — David E Bochna
(74) *Attorney, Agent, or Firm* — Schroeder & Siegfried, P.A.

(57) ABSTRACT

A pipe-fitting adaptor assembly connectable to the coupling end of a pipe fitting is provided for reconfiguring existing pipe fittings with alternate pipe coupling ends. The fitting adaptor assembly has a tubular receptacle member configured to fit over and seal against an insert member of the fitting. A sliding retention ring carried along a ramped section of the fitting insert member interlocks with an opening formed in the sidewall of the receptacle member of the fitting adaptor assembly, such that decoupling forces tend to expand the locking ring further into the sidewall opening of the fitting adaptor assembly. The fitting adaptor assembly has a coupling end configured differently than the insert member for connection to otherwise incompatible alternative pipe sizes and/or pipe coupling configurations.

24 Claims, 6 Drawing Sheets

(56) References Cited

U.S. PATENT DOCUMENTS

| | | | |
|---|---|---|---|
| 589,216 | A | 8/1897 | McKee |
| 651,134 | A | 6/1900 | Dickens |
| 679,399 | A | 7/1901 | Smith et al. |
| 781,952 | A | 2/1905 | Jones |
| 925,959 | A * | 6/1909 | Smith .......................... 285/280 |
| 1,370,739 | A | 3/1921 | Gay |
| 1,606,320 | A | 11/1926 | Scott |
| 1,802,499 | A | 4/1931 | Chapman |
| 1,928,316 | A | 9/1933 | Muto |
| 2,031,754 | A * | 2/1936 | Bacigalupi .................... 239/201 |
| 2,332,350 | A | 10/1943 | Scritchfield |
| 2,344,163 | A | 3/1944 | Misch |
| 2,478,586 | A | 8/1949 | Krapp |
| 2,793,055 | A | 5/1957 | Meyerhoefar |
| 2,833,567 | A | 5/1958 | Bacher et al. |
| 2,839,075 | A | 6/1958 | Mueller |
| 2,978,262 | A | 4/1961 | Franck |
| 3,154,329 | A | 10/1964 | Skinner |
| 3,158,388 | A | 11/1964 | Marshall |
| 3,162,211 | A | 12/1964 | Barusch |
| 3,167,335 | A | 1/1965 | Maisch |
| 3,258,822 | A | 7/1966 | Schlesch et al. |
| 3,280,846 | A | 10/1966 | Anderson et al. |
| 3,343,724 | A | 9/1967 | Malpas |
| 3,432,188 | A | 3/1969 | Turner |
| 3,439,942 | A | 4/1969 | Moore et al. |
| 3,460,715 | A | 8/1969 | Lane et al. |
| 3,460,721 | A | 8/1969 | Hamel et al. |
| 3,471,176 | A | 10/1969 | Gilchrist |
| 3,489,441 | A | 1/1970 | Malcolm |
| 3,495,615 | A | 2/1970 | Ehrens et al. |
| 3,509,905 | A | 5/1970 | Mullins |
| 3,554,217 | A | 1/1971 | Ehrens et al. |
| 3,580,269 | A | 5/1971 | Ehrens et al. |
| 3,633,948 | A | 1/1972 | Dickey |
| 3,756,267 | A | 9/1973 | Hutton |
| 3,762,263 | A | 10/1973 | Bocceda |
| 3,773,360 | A * | 11/1973 | Timbers ................ F16L 37/088 285/307 |
| 3,825,286 | A | 7/1974 | Henry, III |
| 3,891,150 | A | 6/1975 | Hoff et al. |
| 3,990,729 | A | 11/1976 | Szentmihaly et al. |
| 3,999,785 | A | 12/1976 | Blakeley |
| 4,034,802 | A | 7/1977 | Schwarz |
| 4,076,038 | A | 2/1978 | Wynne |
| 4,112,944 | A | 9/1978 | Williams |
| 4,158,461 | A | 6/1979 | Francis |
| 4,183,120 | A | 1/1980 | Thorne |
| 4,212,487 | A | 7/1980 | Jones et al. |
| 4,222,593 | A | 9/1980 | Lauffenburger |
| 4,225,162 | A | 9/1980 | Dola |
| 4,239,265 | A | 12/1980 | King, Sr. |
| 4,258,742 | A | 3/1981 | Louthan et al. |
| 4,364,406 | A | 12/1982 | Bohlin |
| 4,373,235 | A | 2/1983 | Korgaonkar |
| 4,396,210 | A | 8/1983 | Spencer, III et al. |
| 4,434,809 | A | 3/1984 | Rogstadius |
| 4,522,339 | A | 6/1985 | Costa |
| 4,540,011 | A | 9/1985 | Croxford et al. |
| 4,557,024 | A | 12/1985 | Roberts et al. |
| 4,574,443 | A | 3/1986 | Persak et al. |
| 4,647,075 | A | 3/1987 | Vargo |
| 4,730,636 | A | 3/1988 | Volgstadt et al. |
| 4,763,932 | A | 8/1988 | Matz et al. |
| 4,789,189 | A | 12/1988 | Robertson |
| D307,541 | S | 5/1990 | Tres |
| 4,934,655 | A * | 6/1990 | Blenkush ................ F16L 37/42 285/308 |
| 4,935,992 | A | 6/1990 | Due |
| 4,946,205 | A * | 8/1990 | Washizu ....................... 285/319 |
| 5,054,820 | A | 10/1991 | Lesquir et al. |
| 5,076,318 | A | 12/1991 | Fedora |
| 5,095,564 | A | 3/1992 | Kruger |
| 5,105,844 | A | 4/1992 | King, Sr. |
| 5,157,815 | A | 10/1992 | Dyer |
| 5,216,784 | A | 6/1993 | Dyer |
| 5,241,981 | A | 9/1993 | Ahern |
| 5,345,964 | A | 9/1994 | Friedel |
| 5,425,395 | A | 6/1995 | Brennan |
| 5,518,278 | A | 5/1996 | Sampson |
| 5,577,529 | A | 11/1996 | Katz |
| 5,609,181 | A | 3/1997 | Evans |
| 5,640,991 | A | 6/1997 | King |
| 5,671,770 | A | 9/1997 | Rusche et al. |
| 5,694,972 | A | 12/1997 | King |
| 5,732,732 | A | 3/1998 | Gross et al. |
| 5,846,412 | A | 12/1998 | Tharp |
| 5,896,885 | A | 4/1999 | Svetlik |
| 5,921,586 | A | 7/1999 | Prassas et al. |
| 5,964,240 | A | 10/1999 | Granovski |
| 5,964,241 | A | 10/1999 | King |
| 5,967,168 | A | 10/1999 | Kitani et al. |
| 6,012,475 | A | 1/2000 | Taylor et al. |
| 6,015,168 | A | 1/2000 | Fahl |
| 6,062,607 | A | 5/2000 | Bartholomew |
| 6,089,619 | A | 7/2000 | Goda |
| 6,206,433 | B1 * | 3/2001 | Bloomer ........................ 285/88 |
| 6,216,723 | B1 | 4/2001 | King |
| 6,220,635 | B1 | 4/2001 | Vitel et al. |
| 6,357,472 | B1 | 3/2002 | King |
| 6,439,620 | B1 | 8/2002 | Guest |
| 6,473,943 | B1 | 11/2002 | Thacker |
| 6,510,865 | B2 | 1/2003 | King, Jr. et al. |
| 6,601,605 | B2 | 8/2003 | King, Jr. |
| 6,767,033 | B2 | 7/2004 | King, Jr. et al. |
| 6,773,036 | B1 | 8/2004 | King |
| 6,791,031 | B1 | 9/2004 | Manning |
| 6,986,532 | B1 | 1/2006 | King |
| 2001/0032667 | A1 | 10/2001 | King, Jr. et al. |
| 2002/0163191 | A1 | 11/2002 | Muenster et al. |

OTHER PUBLICATIONS

Why Blu-Lock, The Future of Irrigation Installation, http://www.blulock.com/why.html, web page printed Apr. 12, 2007.

* cited by examiner

PIPE-FITTING WITH ADAPTOR ASSEMBLY AND RELATED METHODS

CROSS-REFERENCE TO RELATED APPLICATIONS

This application claims the benefit of U.S. Provisional Patent Application No. 61/555,801, filed Nov. 4, 2011, and is a continuation-in-part of U.S. patent application Ser. No. 12/416,814, filed Apr. 1, 2009, which is a continuation-in-part of U.S. patent application Ser. No. 11/868,231, filed Oct. 5, 2007. U.S. patent application Ser. No. 12/416,814 also claims the benefit of U.S. Provisional Patent Application No. 61/041,520, filed Apr. 1, 2008, and U.S. patent application Ser. No. 11/868,231 claims the benefit of U.S. Provisional Patent Application No. 60/914,669, filed Apr. 27, 2007 and U.S. Provisional Patent Application No. 60/850,219, filed Oct. 6, 2006. The entire disclosures of each of the above applications are incorporated herein by reference.

FIELD

The present disclosure relates generally to fittings for pipes and, more particularly, to adaptors connectable to fittings which provide alternative coupling options for facilitating connection to differently sized pipe, for accommodating differently configured pipe connections, and/or for adapting existing fittings for alternate means of connectivity.

BACKGROUND

A pipe fitting may be connected to an end portion of a pipe used in transporting fluid (e.g., liquid, gas, etc.), for example, for closing the pipe, connecting the pipe to one or more other pipes, changing the direction of fluid flow through the pipe, connecting the pipe to one or more other pipes having similar diameters and/or different diameters, etc. In addition, in irrigation systems, fittings may be used for connecting an end of a pipe to one or more irrigation sprinklers.

During installation and repair of such pipe and irrigation systems, it is not uncommon to encounter situations requiring connection of pipe of differing sizes, different coupling configurations, different sprinkler heads, etc. Multi-pipe junctions, such as Tee Connectors, Cross Tees, etc., may also be encountered which may require the interconnection of multiple varying pipe sizes and/or coupling configurations. The possibilities are numerous, leaving manufacturers and installers in a quandary; either manufacture and stock numerous costly specialized fittings or devise make-shift fittings in the field to facilitate the needs of the install/repair contractor. The first solution is undesirable in that it substantially increases manufacturing costs and SKU (Stock Keeping Unit) requirements. The second solution is labor intensive and is likely to lead to unpredictable results and/or costly future repairs.

Therefore, there is a distinct need in the general piping and irrigation industry for a versatile pipe-fitting adaptor assembly which can provide alternative coupling options for effectively and expeditiously connecting differently sized pipe and/or accommodating many alternative coupling combinations—an assembly which is capable of adapting existing fittings for alternate pipe sizes and means of connectivity. Such an assembly will effectively eliminate the need for make-shift in-field solutions to pipe compatibility problems, and substantially reduce manufacturing costs for specialized fittings and associated SKU requirements.

SUMMARY

According to various aspects of the present disclosure, a pipe-fitting adaptor assembly is provided for adapting existing pipe fittings that are connectable to end portions of pipes with alternative coupling ends for connection to differently sized pipes and/or pipe-end coupling combinations. More specifically, a pipe-fitting adaptor assembly is provided for reconfiguring existing pipe fittings having one or more coupling ends which include a pipe insert member configured to be received at least partly within an end portion of a pipe, similar to the pipe fittings disclosed in our co-pending U.S. patent application Ser. No. 12/416,814.

In one exemplary embodiment, a pipe-fitting adaptor assembly includes a receptacle member configured to fit over the insert member of such a pipe fitting. The receptacle member is tubular in configuration and has an open end leading to a defined interior space for receiving in sealed relation at least part of an end portion of the pipe insert member. A retention member coupled to the insert member of the pipe fitting interlocks with portions of the interior of the receptacle member when at least part of the insert member is received within the receptacle member of the pipe-fitting adaptor assembly. The retention member is configured to engage portions of the interior surface of the receptacle member to positively lock the adaptor assembly to the insert member and prevent dislodgment thereof during normal use. An adaptor coupling member having a coupling end which is sized and/or configured differently than the pipe fitting insert member is connected to the receptacle member of the fitting adaptor assembly. The adaptor coupling member is connected in fluid communication to the receptacle member so as to effectively reconfigure the existing pipe fitting for connection to an otherwise incompatible alternative pipe size and/or pipe coupling configuration.

In another embodiment, a pipe-fitting adaptor assembly includes a similar tubular receptacle member configured to fit over the insert member of such a pipe fitting in sealed relation thereto. An adaptor coupling member having a coupling end configured differently than the insert member is connected in fluid communication to the receptacle member so as to reconfigure the existing pipe fitting for connection to otherwise incompatible alternative pipe sizes and/or pipe coupling configurations. A retention member in the form of a sleeve is carried in slidable relation along the body of the insert member and is adapted to interlock positively with a catch formed in the sidewall of the receptacle member when at least part of the insert member is received within the receptacle member of the pipe-fitting adaptor assembly. The catch may be in the form of a recess or opening in the receptacle sidewall, which may extend partially or entirely through the receptacle sidewall.

In still another example embodiment, a pipe-fitting adaptor assembly includes a tubular receptacle member with an open interior configured to fit over the insert member of such a pipe fitting in sealed relation thereto. An adaptor coupling member having a coupling end configured differently than the insert member is connected in fluid communication to the receptacle member, and the receptacle member includes a catch member on its interior surface for interlocking with a retention member carried by the insert member when at least part of the insert member is received within the receptacle member of the pipe-fitting adaptor assembly. The insert member includes a ramped surface portion along which the retention member moves to radially expand the retention member and cause increased locking strength between the pipe insert member and receptacle member in response to an increase in axial decoupling forces.

In yet another example embodiment, a pipe-fitting adaptor assembly includes a tubular receptacle member configured to fit in sealed relation over a pipe fitting insert member, and an adaptor coupling member having a coupling end configured differently than the insert member. A retention member in the form of a non-continuous sleeve or locking ring is carried by the insert member of the pipe fitting and lockingly engages a sidewall opening in the receptacle member of the fitting adaptor assembly when at least part of the insert member is received within the receptacle member. The sidewall opening in the receptacle member is configured to permit access to the retention member from the exterior of the assembly to facilitate removal of the retention member and disconnection of the fitting adaptor assembly from the fitting, if desired.

Embodiments are also provided for methods of connecting a pipe fitting adaptor assembly to a pipe fitting having a coupling end in the form of a pipe insert member. In one example embodiment, a method for connecting a pipe fitting adaptor assembly to such a fitting generally includes positioning a receptacle member of the adaptor assembly relative to the pipe fitting such that an insert member of the fitting is inserted into an inner passageway of the receptacle member, and lockingly engaging a portion of the receptacle member with a retention member coupled to the insert member. The retention member is movable relative to the insert member to increase locking strength of the retention member in response to an increase in axial decoupling forces. The method may also include providing an opening in the sidewall of the adaptor receptacle member for permitting access to the retention member from the exterior of the assembly to facilitate removal of the retention member and disconnection of the fitting adaptor assembly from the fitting, if desired.

Further areas of applicability will become apparent from the description provided herein. The description and specific examples in this summary are intended for purposes of illustration only and are not intended to limit the scope of the present disclosure.

DRAWINGS

These and other objects and advantages of the present invention will more fully appear from the following description, made in connection with the accompanying drawings, wherein like reference characters refer to the same or similar parts throughout the several views, and in which.

DETAILED DESCRIPTION

Figure 1:
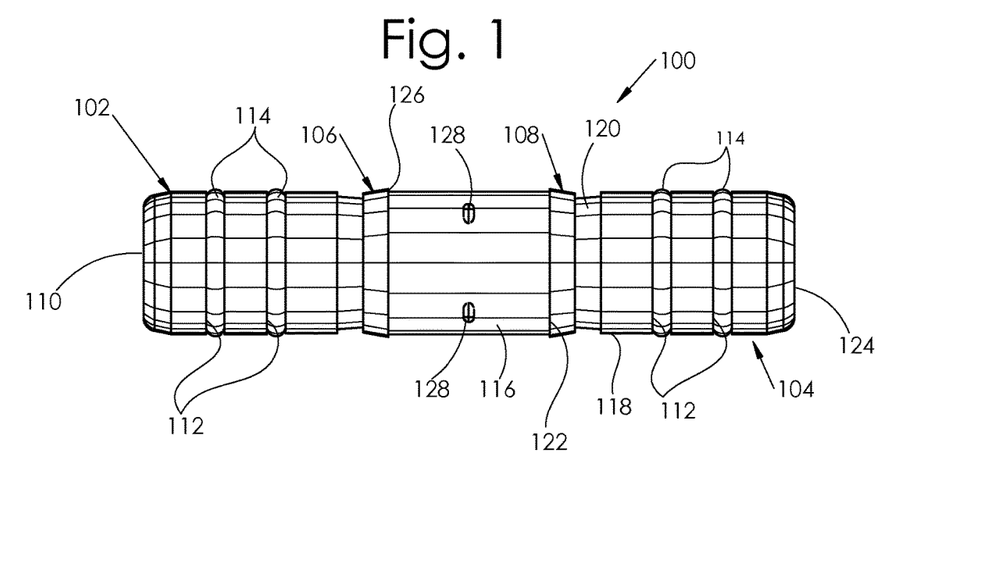
FIG. 1 is a side elevation view of an example embodiment of a fitting connectable to end portions of pipes, for example, for connecting two pipes together.
Figure 2:
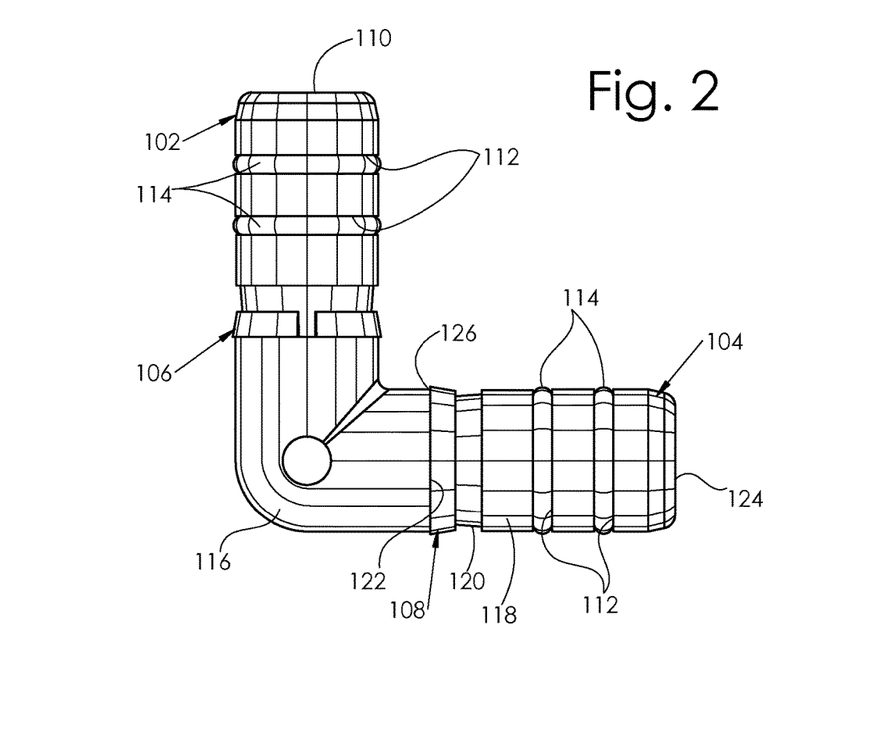
FIG. 2 is a side elevation view of an example embodiment of a fitting similar to that shown in FIG. 1 and connectable to end portions of pipes, but formed in the shaped of a ninety degree elbow.
Figure 3:
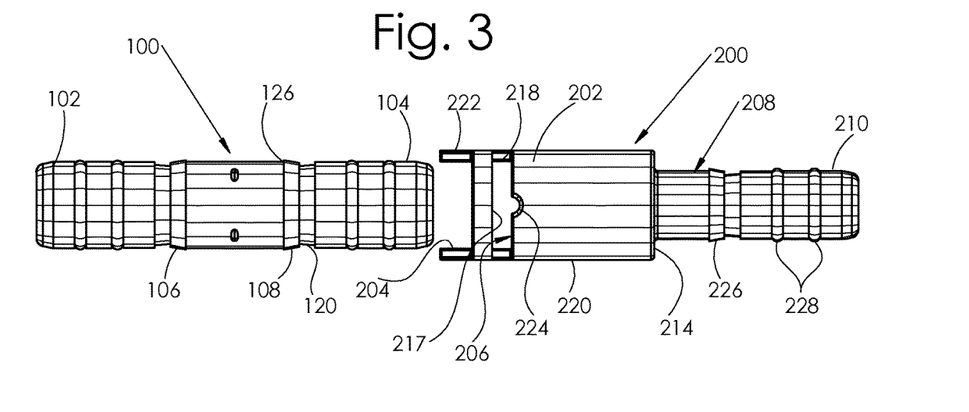
FIG. 3 is a side elevation view of the fitting of FIG. 1 with a pipe-fitting adaptor assembly connectable to the fitting and constructed in accordance with the present disclosure.

With reference now being made to the drawings, FIGS. 1 and 2 illustrate example embodiments of a typical fitting 100 having opposite coupling ends in the form of respective pipe insert members 102 and 104 configured to be connectable to end portions of pipes (not shown). The illustrated fitting 100 can be used to connect two similarly sized pipes together, and may take the form of a straight connector element as in FIG. 1, an elbow as in FIG. 2, or other conceivable configuration. In other example embodiments, similar fittings may be used, for example, for terminating, or closing, a pipe; for connecting three or more pipes together (e.g., Tees, Cross Tees, etc.); for connecting pipes to irrigation sprinklers; for connecting pipes to valves; or for connecting pipes to other differently sized and/or configured pipes, tubing, valves, sprinkler heads, etc.

As shown in FIGS. 1 and 2, the illustrated fitting 100 generally includes first and second generally tubular-shaped insert members 102 and 104 with respective associated annular sleeves 106 and 108 (broadly, retention members). The insert members 102 and 104, and respective retention members 106 and 108 of fitting 100 are each configured (e.g., sized, shaped, constructed, etc.) for use, under normal circumstances, in interconnecting two individual pipes, etc., of similar configuration. Retention members 106 and 108 function generally to engage an inner surface of such a pipe, etc., when received therein and frictionally secure the pipe, etc., to the insert member.

Sealing elements 114 (e.g., an O-ring, gaskets, etc.) are configured to seat within peripheral channels 112 of each of the insert members 102 and 104 to engage (e.g., sealingly engage, compressively engage, etc.) an inner surface of the pipe, etc., within which it is received. While the illustrated fitting 100 depicts the use of multiple sealing members 114, it is certainly contemplated that the fitting 100 may include only a single sealing member 114, or alternatively no sealing member, without departing from the scope of the present disclosure. Moreover, it is also considered possible within the scope of the present disclosure for the sealing members 114 to be integrally, or monolithically, molded or formed with the insert members 102 and 104.

An interior passageway 110 (not shown) is centrally defined generally through the tubular insert members 102 and 104 for allowing fluid to flow through the fitting 100. The interior passage 110 extends completely through the fitting 100 to thereby allow the fluid to flow through the fitting 100 and between pipes, etc., interconnected by the fitting 100 (e.g., connected to the respective first and second insert members 102 and 104 of the fitting 100, etc.). The illustrated fitting 100 is formed as a single piece of material such that the insert members 102 and 104 are an integral, or monolithic, structure. However, it is contemplated within the scope of the present disclosure that the insert members 102 and 104 may be formed separately and coupled together to form the fitting 100.

For purposes of the following discussion, it will be appreciated that the apparatus and methods disclosed herein pertain more particularly to fittings and adaptor assemblies used to connect two or more adjoining pipes, valves, sprinkler heads, etc., of dissimilar size and/or configuration. Moreover, although the present disclosure will focus primarily on fittings for connecting two individual sections of pipe, pipes to valves, sprinkler heads, etc., it will be appreciated that the present disclosure is equally applicable to fittings for connecting three or more sections of pipe (e.g., Tees, Cross Tees, etc.), as well as pipes to valves, sprinkler heads, etc., of dissimilar size and/or configuration.

With reference now to FIGS. 3-6, it can be seen that one or more of the coupling ends (insert members 102 and 104) of fitting 100 may be fitted with a pipe-fitting adaptor assembly 200 to facilitate adaptation of the fitting 100 for connection between two or more adjoining pipes, valves, sprinkler heads, etc., of dissimilar size and/or configuration. Since the insert members 102 and 104 of fitting 100 and respective retention members 106 and 108 are similarly configured (e.g., sized, shaped, constructed, etc.) to be cooperatively received within end portions of similarly configured pipes, etc., for purposes of the present illustration, the following discussion will be limited to the connection of pipe-fitting adaptor assembly 200 to insert member 104 of fitting 100. It will be understood, however, that the construction of the various components and interconnection of adaptor assembly 200 with insert member 102 of fitting 100 and/or other similarly configured insert members is substantially the same and within the scope of the present disclosure.

The adaptor assembly 200 generally includes a receptacle member 202 configured to fit over the insert member 104 of pipe fitting 100. The receptacle member 202 is tubular in configuration and has an open end 204 leading to a defined interior space 206 (shown best in FIG. 6) for receiving at least part of an end portion of the pipe insert member 104 of fitting 100. An adaptor coupling member 208 having a coupling end 210 which is sized and/or configured differently than the pipe fitting insert member 104 is connected to the receptacle member 202 of the fitting adaptor assembly 200. As illustrated, the coupling end 210 in FIGS. 3-6 is depicted with a general configuration similar to insert member 104 of fitting 100, but is sized smaller for connection to smaller diameter pipe sizes. As will become apparent hereafter, however, other size and/or configurations of adaptor assembly coupling ends are also conceivable within the scope of the present disclosure.

As further illustrated, the pipe-fitting adaptor assembly 200 is formed of a single piece of material such that the receptacle member 202 and coupling member 208 are an integral, or monolithic, structure. However, it will be appreciated that the receptacle member 202 and coupling member 208 may be formed separately and coupled together to form the pipe-fitting adaptor assembly 200 within the scope of the present disclosure.

Figure 6:
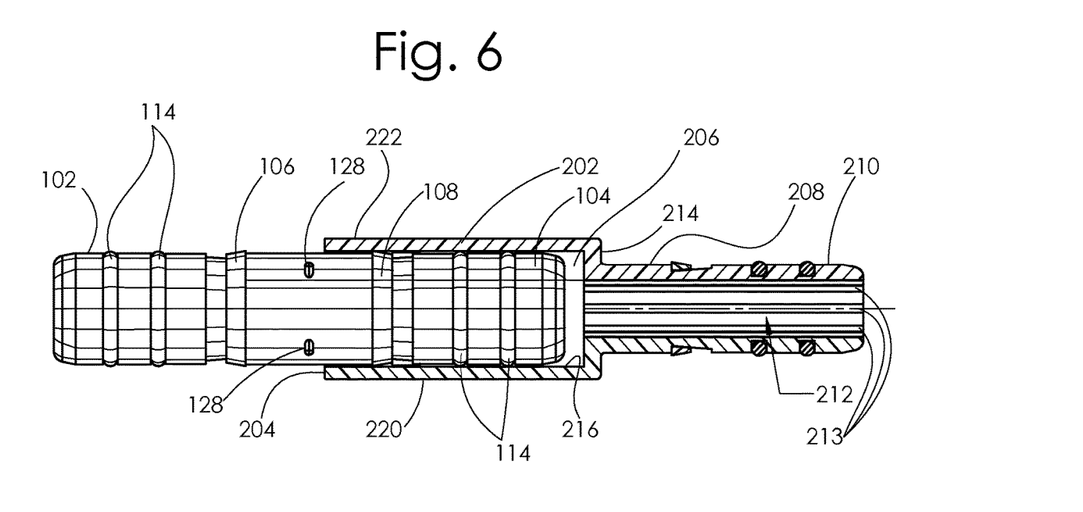
FIG. 6 is a side elevation view of the assembled fitting and pipe-fitting adaptor assembly shown in FIG. 5, with the pipe-fitting adaptor assembly being sectioned vertically.

As best shown in FIG. 6, the adaptor coupling member 208 is connected in fluid communication to the receptacle member 202 so as to effectively reconfigure the existing pipe fitting 100 to which it is attached for connection to otherwise incompatible alternative pipe sizes and/or pipe coupling configurations. An interior passageway 212 with longitudinal ribs 213 is centrally defined generally through adaptor coupling member 208 and through the end wall 214 of the receptacle member 202 to communicate fluidly with the interior space 206 of the receptacle member 202. This allows fluid passing through the interior passageway 110 of fitting 100 to flow through the pipe-fitting adaptor assembly 200 and thus between pipes, etc., interconnected by the fitting 100 and adaptor assembly 200 (e.g., a pipe connected to the first insert member 102 of fitting 100 and a pipe connected to the coupling end 210 of pipe-fitting adaptor assembly 200, etc.).

Figure 4:
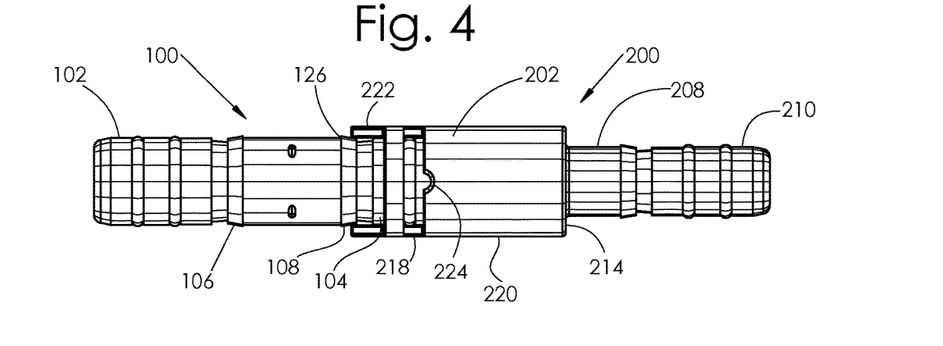
FIG. 4 is a side elevation view of the fitting and pipe-fitting adaptor assembly shown in FIG. 3, shown partially assembled.
Figure 5:
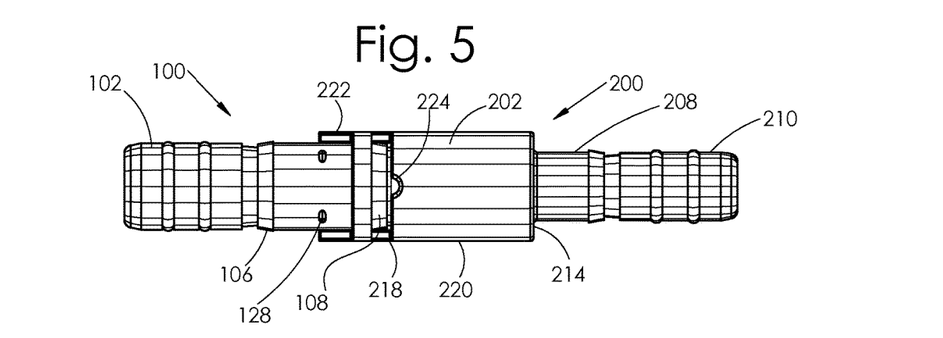
FIG. 5 is a side elevation view of the fitting and pipe-fitting adaptor assembly shown in FIGS. 3 and 4, shown completely assembled.

As shown in FIGS. 3-6, insert member 104 of fitting 100 is configured to be received through the opening 204 in the fitting adaptor assembly 200 and into the interior space 206 defined within the receptacle member 202 thereof. FIG. 4 discloses the insert member 104 partially inserted within the receptacle member 202 of the pipe-fitting adaptor assembly 200, such that one of the seals 114 carried by the insert member 104 of the fitting 100 is seated in engaging relation (e.g., sealingly engaging, compressively engaging, etc.) with the interior surface 216 of the receptacle member 202. FIG. 5 discloses the insert member 104 completely inserted within the receptacle member 202 of the pipe-fitting adaptor assembly 200, such that both of the seals 114 carried by the insert member 104 of the fitting 100 are seated in engaging relation (e.g., sealingly engaging, compressively engaging, etc.) with the interior surface 216 of the receptacle member 202.

When the insert member 104 of fitting 100 is at least partly received within the receptacle member 202 of the pipe-fitting adaptor assembly 200, the sealing element(s) 114 carried by the insert member 104 of fitting 100 effectively seal the pipe-fitting adaptor assembly 200 against the fitting 100. This helps to inhibit fluid flowing through the fitting 100 and adaptor assembly 200 from leaking out at the juncture between the fitting 100 and the pipe-fitting adaptor assembly 200. With the use of multiple spaced seals 114 (e.g., 0.25 inches apart, etc.), as shown in FIGS. 3-6, it has been found that the walls of the receptacle member 202 between the sealing members 114 may tend to relax slightly to help better seal and inhibit fluid leakage between the fitting adaptor assembly 200 and insert member 104 of fitting 100.

As noted previously, fitting 100 includes a retention member 108 coupled to the insert member 104 which, during normal use, functions generally to engage an inner surface of a pipe, etc., to frictionally secure the pipe, etc., upon the insert member 104. This same retention member 108 also serves the function of helping to secure the pipe-fitting adaptor assembly 200 in locked relation upon the insert member 104 when the insert member 104 of fitting 100 is received at least partly within the receptacle member 202 of the pipe-fitting adaptor assembly 200. The manner in which this occurs will be described in more detail hereafter.

As shown in the drawings, the receptacle member 202 of the pipe-fitting adaptor assembly 200 includes at least one internal catch member 217. It is contemplated that the internal catch member 217 of the pipe-fitting adaptor assembly 200 could be configured in any of a variety of forms (e.g., one or more protrusions, latches, detents, recesses, openings, etc.) without departing from the scope of the present disclosure. In the present disclosure, however, the catch member 217 is illustrated generally as a pair of diametrically opposed sidewall recesses or openings 218 extending from the interior surface 216 of receptacle member 202 outwardly toward the exterior surface 220 thereof.

For reasons that will become more apparent hereafter, in the illustrated embodiments, recesses 218 extend completely through the sidewall of receptacle member 202 to form a pair of oppositely disposed accessible openings 218. Openings 218 are configured (e.g., sized, shaped, constructed, etc.) to catch portions of the retention member 108 coupled to the insert member 104 when the insert member 104 of fitting 100 is received at least partly within the receptacle member 202 of pipe-fitting adaptor assembly 200. In this manner, the retention member 108 engages the opening-defining portions 218 of the interior surface of the receptacle member 202 to positively lock the pipe-fitting adaptor assembly 200 to the insert member 104 and prevent dislodgment thereof during normal use.

With reference now to FIGS. 1 and 2, the construction and function of retention member 108 in relation to the pipe-fitting adaptor assembly 200 may be more fully described. As shown, the main body 118 of the insert member 104 includes a ramp section 120, defined generally around the body 118 of the insert member 104 (e.g., generally concentrically formed around the body 118, etc.) and extending longitudinally along the body 118. The illustrated ramp section 120 generally tapers inwardly from the open end portion 124 of insert member 104 and toward the central hub 116 of the fitting 100. In other words, an outer diameter of the ramp section 120 generally decreases in dimension when moving along the ramp section 120 away from the open end portion 124 and toward the central hub 116. A lip 122 is defined around the body 118, generally at the intersection of the ramp section 120 and the central hub 116 of the fitting 100. The lip 122 operates to restrict rearward movement of the retention member 108 along the body 118 to help properly position the retention member 108 within the pipe-fitting adaptor assembly 200 (or within a pipe, etc.), which will be described in more detail hereinafter.

The retention member 108, formed generally as a slidable sleeve element in the present disclosure, is coupled to the insert member 104 generally along the ramp section 120 of the insert member body 118. The illustrated retention member 108 may include a ring that is configured to fit around the ramp section 120 of the body 118. In the illustrated embodiments, the retention ring 108 is depicted as a non-continuous split-ring which, as will be described in more detail hereafter, helps facilitate removal of the retention ring 108 from the pipe-fitting adaptor assembly 200, if desired or necessary. However, it is contemplated that the retention member 108 may also be formed as a continuous ring without departing from the scope of the present disclosure.

The retention member 108 can move along the ramp section 120 between a generally forward position and a generally rearward position. In the rearward position, the retention member 108 is in a generally relaxed (e.g., unexpanded, etc.) position and is located generally adjacent the body's lip 122. As noted previously, the lip 122 operates to restrict rearward movement of the retention member 108 along the ramp section 120 so as to help position the retention member 108 within the end portion of the adaptor's receptacle member 202. In the forward position, the sleeve is located generally away from the body's lip 122 and toward the insert member's open end portion 124. In this position, the retention member 108 may be expanded (broadly, deformed) in shape as it is located along the larger outer diameter portion of the ramp section 120.

As shown best in FIGS. 1-4, the outer diameter of the retention member 108 at a point adjacent lip 122 of insert member 104 is slightly greater than the outer diameter of the lip 122. As such, in free form, the retention member 108 extends radially outward slightly beyond the outer confines of lip 122 to form an exposed edge or shoulder 126. As will be described in more detail hereafter, it is this exposed edge 126 of the retention member 108 which first engages the catch or openings 218 formed in the receptacle member 202 of the pipe-fitting adaptor assembly 200 when the adaptor assembly 200 is assembled to the insert member 104 of the fitting 100.

As best shown in FIG. 4, to assemble the pipe-fitting adaptor assembly 200 and fitting 100, the insert member 104 of the fitting 100 is inserted within the receptacle member 202 of the pipe-fitting adaptor assembly 200. Upon insertion, the terminal flanges 222 of the pipe-fitting adaptor assembly 200 engage the retention member 108 and force it rearward toward the defined lip 122 of fitting 100. Once the retention member 108 engages the lip 122, it is restricted from further rearward movement. Upon further insertion of the insert member within the receptacle 202, the retention member 108 will cooperatively compress slightly as the flange(s) 222 and receptacle member 202 of the pipe-fitting adaptor assembly 200 deflect slightly outward to extend over the retention member 108.

As shown in FIGS. 5 and 6, further advancement of the fitting 100 into the receptacle member 202 of the pipe-fitting adaptor assembly 200 causes the retention member 108 to become aligned with the catch member 217 (e.g., recesses or openings 218) in the receptacle member 202. Once aligned, the retention member 108 releases and expands outward into the openings 218 formed in the receptacle member 202. As illustrated, at least the aligned edge portion 126 of retention member 108 will extend into the openings 218 and catch on the inner sidewall portions of receptacle member 202 that define openings 218, thereby locking the pipe-fitting adaptor assembly 200 on the fitting 100. Seals 114 carried by the insert member 104 of fitting 100 simultaneously engage the inner surface 216 of the receptacle member 202 to effectively seal the pipe-fitting adaptor assembly 200 to the fitting 100, thus preventing any fluid leakage therebetween.

In the above manner, the pipe-fitting adaptor assembly 200 and the fitting 100 become positively interlocked. Any axial movement tending to dislodge the pipe-fitting adaptor assembly 200 from the fitting 100 (e.g., from increasing fluid pressure; physical force; etc.) will cause the retention member 108 to move axially along the ramp section 120 of the insert member 104 toward the larger outer diameter portion of the ramp section 120. By so doing, the retention member 108 expands diametrically, thus forcing the retention member 108 to become even more engaged with the openings 218 in the receptacle member 202 and increasingly interlocked with the pipe-fitting adaptor assembly 200.

The catch member 217 can be formed as one or more recesses in the inner surface 216 of the receptacle member 202 or, as illustrated, one or more openings 218 extending completely through the sidewall thereof. As noted previously, however, with the retention member 108 being constructed in the form of a non-continuous locking split-ring, forming the catch member 217 as an opening 218 extending through the sidewall of the receptacle 202 has the advantage of permitting removal of the locking ring 108, if needed or desired. As shown throughout the drawings, to further facilitate the removal of the retention member 108 through an opening 218 in the receptacle 202, a small notch or access 224 may be formed along one edge of the opening 218 to facilitate the insertion of a small screwdriver or other implement suitable for engaging (e.g., insertion underneath;

grasping, etc.) and removing the locking ring 108 from the insert member 104 and through the opening 218 in the receptacle member 202.

As further shown in FIGS. 5 and 6, with the pipe-fitting adaptor assembly 200 connected to the fitting 100, terminal flanges 222 of the receptacle member 202 help to facilitate proper alignment and installation of the adjoining sections of pipe, etc. During installation, a pipe installer will often try to twist or rotate an adjoining section of pipe, etc., onto the fitting; thus, it is generally desirable to prevent rotation of the pipe-fitting adaptor assembly 200 relative to the fitting 100 when connecting the adjoining pipe, etc. On the other hand, it is also beneficial to be able to rotationally adjust the connecting pipe, etc. relative to the fitting 100 once installed. Therefore, it is also desirable to have the option of rotating the pipe-fitting adaptor assembly relative to the fitting. As discussed hereafter, the flanges 222 of the receptacle member 202 help facilitate both of the above functions.

As shown in FIG. 5, fitting 100 includes one of more external protrusions or lugs 128 extending outwardly from the central hub 116 thereof. Flanges 222 are configured (e.g., sized, shaped, constructed, etc.) to extend axially beyond the lugs 128 on the fitting 100 when the fitting 100 is inserted fully within the pipe-fitting adaptor assembly 200 (as in FIG. 5). In this position, any attempted rotation of the pipe-fitting adaptor assembly 200 relative to the fitting 100 will be resisted by the lugs 128. However, since the retention member 108 permits limited movement along the ramp section 120 (see, FIG. 6), the pipe-fitting adaptor assembly 200 may also shift slightly relative to the fitting 100. Therefore, when the pipe-fitting adaptor assembly 200 is shifted to a position as shown in FIG. 6, flanges 222 do not extend past lugs 128 on the insert member 104. Consequently, the flanges 222 will not engage the lugs 128 and the pipe-fitting adaptor assembly 200 may be rotationally adjusted for proper alignment. In this manner, lugs 128 on fitting 100 and flanges 222 of the adaptor assembly 200 interact to provide a releasable rotation inhibiting mechanism for preventing or allowing rotation of the adaptor assembly 200 relative to the insert member 100, as desired.

In use, connecting a pipe-fitting adaptor assembly 200 to such a fitting 100 generally involves the steps of positioning the receptacle member 202 of the pipe-fitting adaptor assembly 200 such that the insert member 104 of the fitting 100 may be inserted into the inner space/passageway 206 of the receptacle member 202; inserting the insert member 104 into the receptacle member 202 of the pipe-fitting adaptor assembly 200 such that the flanges 222 at the open end portion 204 of the receptacle member engage and move the retention member 108 to a more rearward relaxed (i.e., unexpanded) position along the ramped section 120 of the fitting 100; and continuing insertion of the insert member 104 and retention member 108 into the receptacle member 202 of the pipe-fitting adaptor assembly 200 until the retention member 108 on the insert member 104 becomes aligned with and lockingly engages the catch member 217 of the pipe-fitting adaptor assembly 200.

The process of connecting the pipe-fitting adaptor assembly 200 to the fitting 100 may also include the step of pulling back on the pipe-fitting adaptor assembly 200 (e.g., as to disconnect from the fitting 100) to cause the retention member 108 to move toward the larger diameter portion of the ramp section 120 of fitting 100 and become even more interlocked with in the receptacle member 202 of the pipe-fitting adaptor assembly 200. Further steps may also include providing an opening (such as at 218) in the sidewall of the adaptor receptacle member 202 for permitting access to and removal of the retention member 108 from the exterior of the pipe-fitting adaptor assembly 200; and/or positioning the pipe-fitting adaptor assembly 200 relative to the fitting 100 such that the flanges 222 of the receptacle member 202 either engage or disengage the lugs 128 of fitting 100 to optionally resist or permit rotational movement of the pipe-fitting adaptor assembly 200 relative to the fitting 100.

As shown in FIGS. 3-6, the pipe-fitting adaptor assembly 200 includes an adaptor coupling member 208 having a coupling end 210 in the form of an insert member that is configured similarly to insert member 104, with a corresponding retention member/sleeve 226 and sealing elements 228. The coupling end 210, however, is sized differently than insert member 104 so to accommodate connection to pipes, valves, sprinkler heads, etc., having a smaller internal diameter than that which insert member 104 of fitting 100 can accommodate. Therefore, regardless of whether fitting 100 is configured as a straight fitting (FIG. 1); as a ninety degree elbow (FIG. 2); Tee; Cross Tee; or other conceivable configuration, a single pipe-fitting adaptor assembly 200 may be used to resize and/or otherwise adapt all configurations to accommodate alternative coupling combinations requiring a smaller internal diameter corresponding to that of the coupling end 210.

Figure 7:
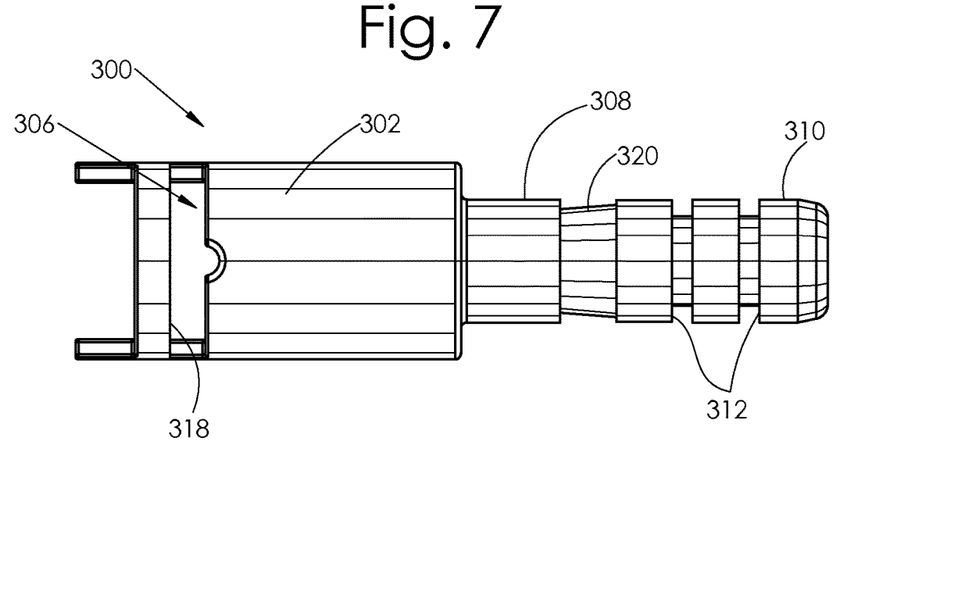
FIGS. 7-10 are each side elevation views of other example embodiments of pipe-fitting adaptor assemblies constructed in accordance with the present disclosure, each of which incorporates an alternative adaptor coupling end.

Numerous other pipe-fitting adaptor assembly configurations with alternative adaptor coupling members are also conceivable. While certainly not intending to limit by the disclosure herein, some further example embodiments of various possible pipe-fitting adaptor assembly configurations with alternative adaptor coupling members are disclosed in FIGS. 7-12 herein. For example, FIG. 7 discloses a pipe-fitting adaptor assembly 300 connectable to the insert member 104 of a similar pipe fitting 100. The pipe-fitting adaptor assembly 300 of this embodiment is similar to the pipe-fitting adaptor assembly 200. The pipe-fitting adaptor assembly 300 includes a tubular receptacle member 302 with an open interior space 306 configured to receive therein the insert member 104 of pipe fitting 100 in sealing relation. A sidewall opening 318 in the receptacle member 302 provides a catch for positively locking the pipe-fitting adaptor assembly 300 to the fitting 100 via the retention member 108 on insert member 104 in a manner similar to that previously described in relation to FIGS. 3-6.

In this embodiment, an adaptor coupling member 308 having an alternative coupling end 310 is connected in fluid communication to the receptacle member 302 of the fitting adaptor assembly 300. The adaptor coupling end 310 is configured in the form of an insert member similar to that of insert member 104, with a ramped section 320 to accommodate a retention member (not shown), and peripheral channels 312 for carrying similar sealing elements (not shown). However, the adaptor coupling end 310 in this embodiment is sized differently than insert member 104 so to accommodate connection to pipes, valves, sprinkler heads, etc., having a larger internal diameter than that which insert member 104 of fitting 100 can accommodate. Therefore, regardless of whether fitting 100 is configured as a straight fitting (FIG. 1); as a ninety degree elbow (FIG. 2); Tee; Cross Tee; or other conceivable configuration, a single pipe-fitting adaptor assembly 300 may be used to resize and/or otherwise adapt all configurations to accommodate alternative coupling combinations requiring a larger internal diameter corresponding to that of the coupling end 310.

Figure 8:
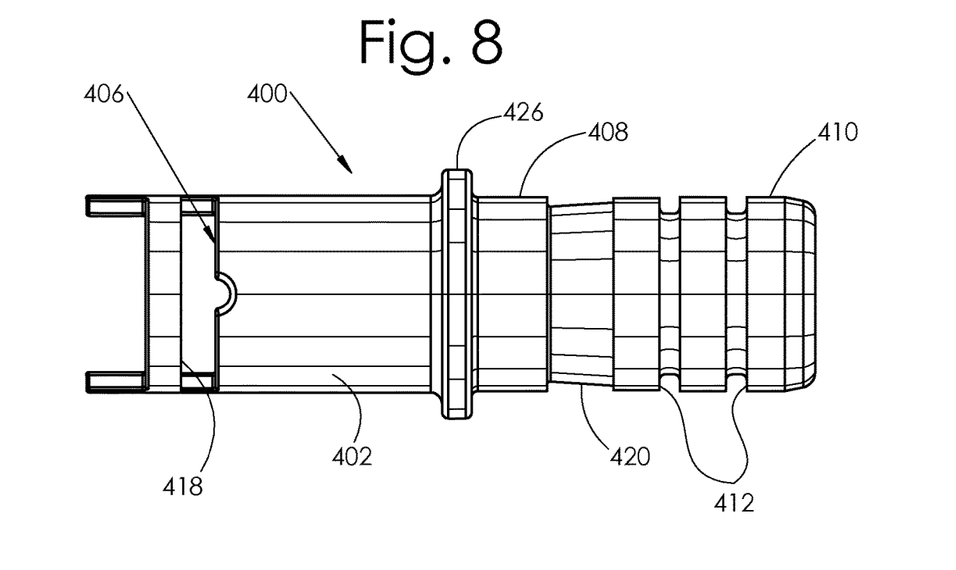

FIG. 8 discloses another example embodiment of a pipe-fitting adaptor assembly 400 connectable to the insert member 104 of a similar pipe fitting 100. The pipe-fitting adaptor assembly 400 of this embodiment is also similar to the pipe-fitting adaptor assembly 200. The pipe-fitting adaptor assembly 400 includes a tubular receptacle member 402 with an open interior space 406 configured to receive therein the insert member 104 of pipe fitting 100 in sealing relation. A sidewall opening 418 in the receptacle member 402 provides a catch for positively locking the pipe-fitting adaptor assembly 400 to the fitting 100 via the retention member 108 on insert member 104 in a manner similar to that previously described in relation to FIGS. 3-6.

In this embodiment, an adaptor coupling member 408 having an alternative coupling end 410 is connected in fluid communication to the receptacle member 402 of the fitting adaptor assembly 400. The adaptor coupling end 410 is configured in the form of an insert member similar to that of insert member 104, with a ramped section 420 to accommodate a retention member (not shown), and peripheral channels 412 for carrying similar sealing elements (not shown). However, the adaptor coupling end 410 in this embodiment is sized even larger than coupling end 310 shown in FIG. 7 so to accommodate connection to pipes, valves, sprinkler heads, etc., of even larger internal diameter.

In addition to the above, the pipe-fitting adaptor assembly 400 in this embodiment also includes an external rib 426 extending at least partially around the periphery of the receptacle member 402. Rib 426 provides an added bearing member against which an installer may gain leverage when assembling adjoining sections of pipe, etc., of larger sizes. Here again, regardless of whether fitting 100 is configured as a straight fitting (FIG. 1); as a ninety degree elbow (FIG. 2); Tee; Cross Tee; or other conceivable configuration, a single pipe-fitting adaptor assembly 400 may be used to resize and/or otherwise adapt all configurations to accommodate alternative coupling combinations requiring a larger internal diameter corresponding to that of the coupling end 410.

Figure 9:
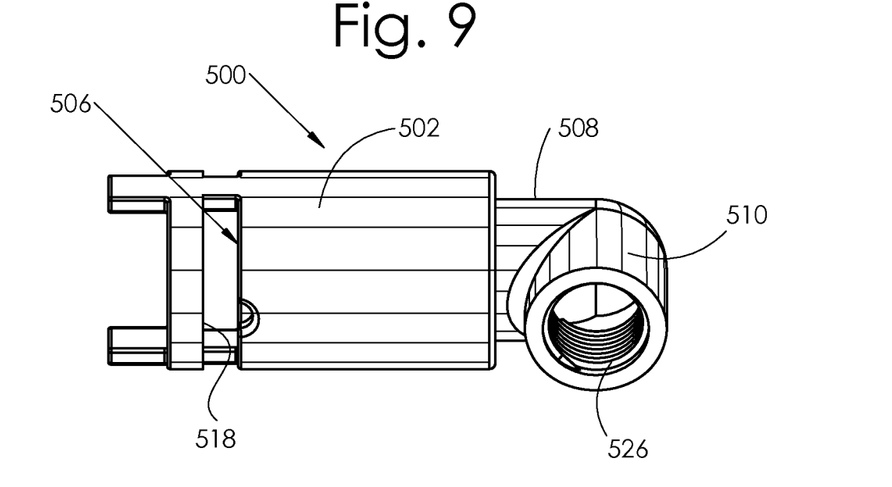

With reference to FIG. 9, still another example embodiment is disclosed of an alternative pipe-fitting adaptor assembly 500 connectable to the insert member 104 of a similar pipe fitting 100. The pipe-fitting adaptor assembly 500 of this embodiment is also similar to the previous pipe-fitting adaptor assembly 200 in that it includes a tubular receptacle member 502 with an open interior space 506 configured to receive therein the insert member 104 of pipe fitting 100 in sealing relation. A sidewall opening 518 in the receptacle member 502 provides a catch for positively locking the pipe-fitting adaptor assembly 500 to the fitting 100 via the retention member 108 on insert member 104 in a manner similar to that previously described in relation to FIGS. 3-6.

In this embodiment, however, an adaptor coupling member 508 having an alternative coupling end 510 is connected in fluid communication to the receptacle member 502 of the fitting adaptor assembly 500. The adaptor coupling end 510 of this embodiment is configured alternatively in the form of a ninety degree elbow with a female pipe thread 526 for coupling to adjoining pipe, valves, sprinkler heads, etc., with coupling ends having corresponding male threads. The threaded connection 526 can be provided in any of a variety of sizes and, although not shown, could alternatively take the form of a male threaded spigot connectable to corresponding pipe, valves, sprinkler heads, etc., with coupling ends having corresponding female threads. Therefore, regardless of whether fitting 100 is configured as a straight fitting (FIG. 1); as a ninety degree elbow (FIG. 2); Tee; Cross Tee; or other conceivable configuration, a single pipe-fitting adaptor assembly 500 may be used to reconfigure the coupling ends of all configurations of fitting 100 to accommodate alternative coupling combinations requiring a threaded connection corresponding to that of the coupling end 510.

Figure 10:
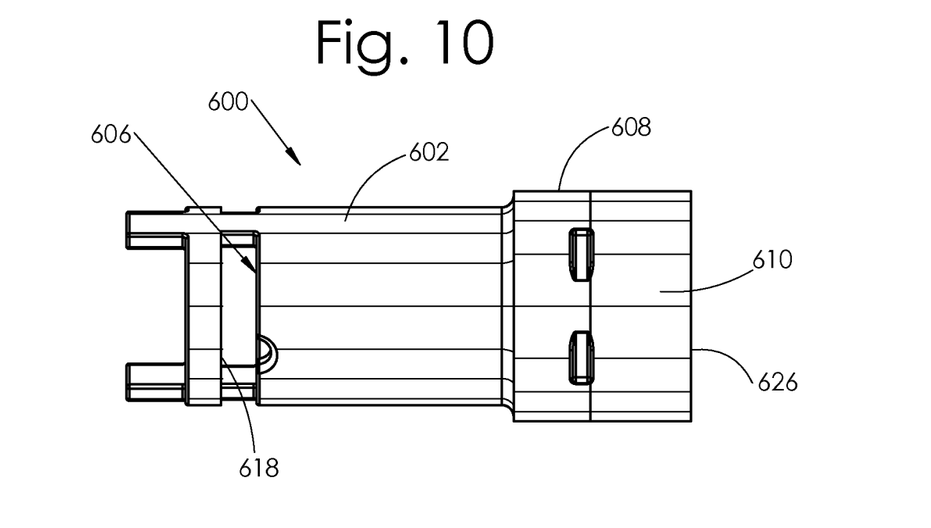

In the further example embodiment of FIG. 10, another alternative pipe-fitting adaptor assembly 600 connectable to the insert member 104 of a similar pipe fitting 100 is disclosed. The pipe-fitting adaptor assembly 600 of this embodiment is also similar to the previous pipe-fitting adaptor assembly 200 in that it includes a tubular receptacle member 602 with an open interior space 606 configured to receive therein the insert member 104 of pipe fitting 100 in sealing relation. A sidewall opening 618 in the receptacle member 602 provides a catch for positively locking the pipe-fitting adaptor assembly 600 to the fitting 100 via the retention member 108 on insert member 104 in a manner similar to that previously described in relation to FIGS. 3-6.

In this embodiment, however, an adaptor coupling member 608 having an alternative coupling end 610 is connected in fluid communication to the receptacle member 602 of the fitting adaptor assembly 600. The adaptor coupling end 610 of this embodiment is configured alternatively in the form of a female slip coupler 626 which is adapted to telescope over sections of pipe, valves, sprinkler heads, etc., having corresponding male coupling ends suitable to be received within the slip coupler 626. In circumstances requiring a sealed connection, the internal surface of the slip coupler 626 may be adhered to the adjoining pipe, etc. Here again, the slip coupler 626 can be provided in any of a variety of sizes. Therefore, regardless of whether fitting 100 is configured as a straight fitting (FIG. 1); as a ninety degree elbow (FIG. 2); Tee; Cross Tee; or other conceivable configuration, a single pipe-fitting adaptor assembly 600 may be used to reconfigure the coupling ends of all configurations of fitting 100 to accommodate alternative coupling combinations requiring a connection corresponding to that of the coupling end 610.

Figure 11:
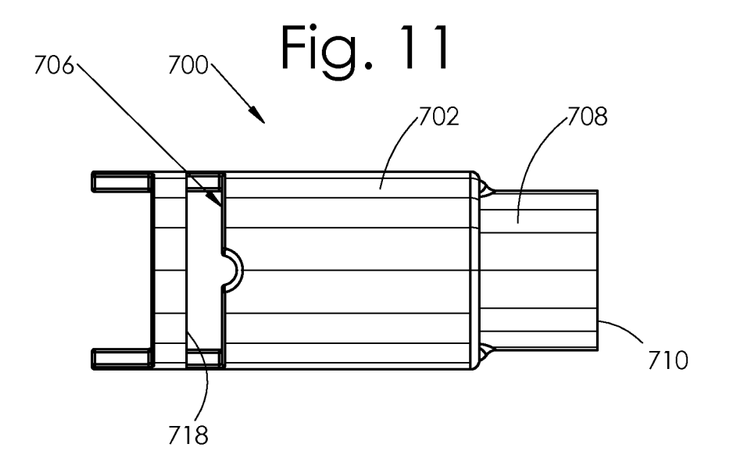
FIG. 11 is the side elevation view of still another example embodiment of a pipe-fitting adaptor assembly constructed in accordance with the present disclosure and incorporating yet another alternative adaptor coupling end.
Figure 12:
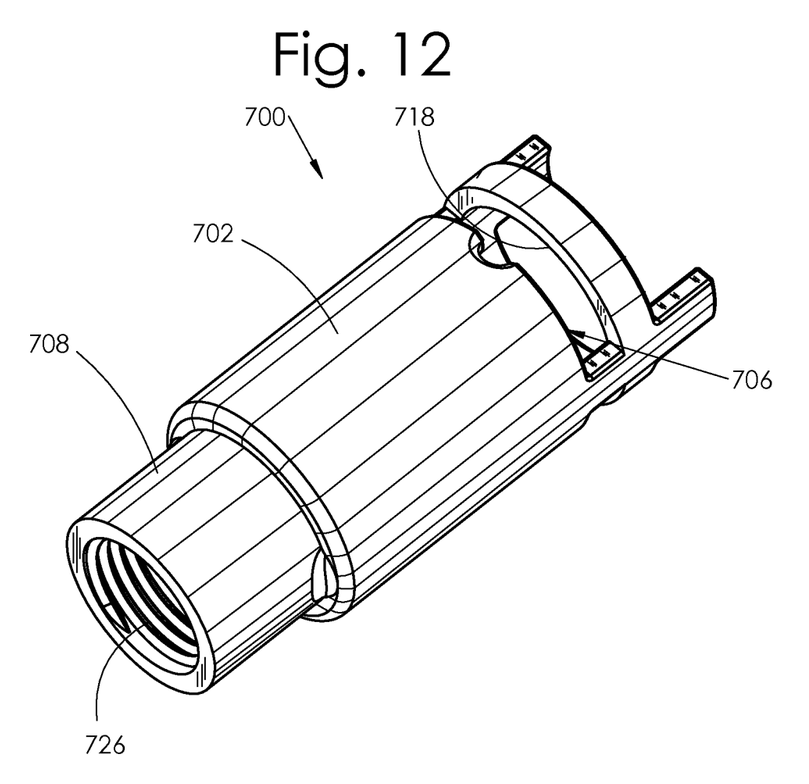
FIG. 12 is a perspective view of the pipe-fitting adaptor assembly shown in FIG. 11, showing the internal threads of the alternative adaptor coupling end thereof.

FIGS. 11-12 illustrate still another alternative pipe-fitting adaptor assembly 700 connectable to the insert member 104 of a similar pipe fitting 100 is disclosed. As in previous embodiments, the pipe-fitting adaptor assembly 700 of this embodiment is similar to the pipe-fitting adaptor assembly 200 in that it includes a tubular receptacle member 702 with an open interior space 706 configured to receive therein the insert member 104 of pipe fitting 100 in sealing relation. A sidewall opening 718 in the receptacle member 702 provides a catch for positively locking the pipe-fitting adaptor assembly 700 to the fitting 100 via the retention member 108 on insert member 104 in a manner similar to that previously described in relation to FIGS. 3-6.

In this embodiment, however, an adaptor coupling member 708 having an alternative coupling end 710 is connected in fluid communication to the receptacle member 702 of the fitting adaptor assembly 700. The adaptor coupling end 710 of this embodiment is configured alternatively as a straight female pipe thread 726 for coupling to adjoining pipe, valves, sprinkler heads, etc., with coupling ends having corresponding male threads. The threaded connection 726 can be provided in any of a variety of sizes and, although not shown, could alternatively take the form of a male threaded spigot connectable to corresponding pipe, valves, sprinkler heads, etc., with coupling ends having corresponding female threads. Therefore, regardless of whether fitting 100 is configured as a straight fitting (FIG. 1); as a ninety degree elbow (FIG. 2); Tee; Cross Tee; or other conceivable configuration, a single pipe-fitting adaptor assembly 700 may be used to reconfigure the coupling ends of all configurations of fitting 100 to accommodate alternative coupling combinations requiring a threaded connection corresponding to that of the coupling end 710.

As shown by the above example embodiments, with the use of any one of the pipe-fitting adaptor assemblies disclosed herein, numerous alternative coupling options for effectively and expeditiously connecting differently sized pipe and/or accommodating many alternative coupling combinations is provided. Such a pipe-fitting adaptor assembly provides the capability of adapting existing pipe fittings having multiple coupling ends with one or more alternate sized/configured coupling ends, thus effectively eliminating the need for make-shift in-field solutions to pipe compatibility problems, and substantially reducing the significant manufacturing costs and SKU (Stock Keeping Unit) requirements associated with maintaining numerous specialized fittings.

It should be appreciated that the fittings, pipe-fitting adaptor assemblies, retention members, etc., disclosed herein may be formed from any number of materials, including without limitation, various plastic or thermoplastic materials, such as nylon, styrene, acrylonitrile butadiene styrene (ABS); polyvinyl siloxane (PVS), Polyvinyl chloride (PVC), etc. Combinations of various materials are also contemplated to be within the scope of the present disclosure. For example, and without limitation, the fitting and fitting adaptor assembly could be formed of ABS, with the retention member formed of nylon; alternatively, a PVC fitting with a PVS retention member could be used in combination with a fitting adaptor assembly formed from ABS. The sealing elements described herein could be formed of an elastomeric material, or any other material suitable for creating a fluid seal between adjoining parts.

When considering the present disclosure, it should be appreciated that the specific dimensions, angular rotations, etc. included in the disclosure are example in nature and do not limit the scope of the present disclosure. Moreover, it is noted that certain terminology used herein is for purposes of reference only, and is not intended to be limiting in any manner. For instance, terms such as "upper", "lower", "above", "below", "top", "bottom", "upward", "downward", "rearward", and "forward" may refer to directions in the drawings to which reference is made. Similarly, terms such as "front", "back", "rear", "bottom" and "side", may describe the orientation of portions of the component within a consistent but arbitrary frame of reference which is made clear by reference to the text and the associated drawings describing the component under discussion. Such terminology may include the words specifically mentioned above, derivatives thereof, and/or words of similar import. Also, the terms "first", "second" and other such numerical terms referring to structures do not imply a sequence or order unless clearly indicated by the context.

Furthermore, when introducing elements or features and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It should be further understood that the method steps, processes, and operations described herein are not to be construed as necessarily requiring their performance in the particular order discussed or illustrated, unless specifically identified as an order of performance. It is also to be understood that additional or alternative steps may be employed.

The foregoing description of the embodiments has been provided for purposes of illustration and description only, and is not intended to be exhaustive or to limit the scope of the invention herein. Individual elements or features of a particular embodiment are generally not limited to that particular embodiment and, where applicable, may be interchangeable and used in other selected embodiments, even if not specifically shown or described as such. Accordingly, various changes may be made in the form, details, arrangement and proportions of the parts without departing from the scope of the invention, which comprises the matter shown and described herein, and set forth in the appended claims.

What is claimed is:

1. A pipe fitting and adaptor assembly, comprising:
a pipe fitting having a pipe insert member;
an adaptor receptacle member having an open end for receiving at least a portion of said pipe insert member therein, said receptacle member being configured for connection in fluid communication with said pipe insert member of said pipe fitting;
an adaptor coupling member connected in fluid communication and formed integrally with said receptacle member, said adaptor coupling member being configured as a coupling-pipe insert with a moveable retainer for connection to an end portion of a pipe that is incompatible for connection to said pipe insert member; and
a retention member disposed between and interlocking said pipe insert member and said receptacle member together when at least a portion of said pipe insert member is received within said receptacle member, said retention member being movably carried by said pipe insert member apart from said receptacle member and being movable relative to said pipe insert member and said receptacle member.

2. The pipe fitting and adaptor assembly of claim 1, wherein said pipe insert member includes a ramp section, and said retention member is comprised of a sleeve carried by said pipe insert member and moveable relative thereto generally along said ramp section.

3. The pipe fitting and adaptor assembly of claim 1, wherein said retention member imparts an increasing force against said receptacle member in response to an increase of internal pressure within the pipe.

4. The pipe fitting and adaptor assembly of claim 3, wherein said retention member is comprised of a slidable sleeve member that extends at least partially around said pipe insert member.

5. The pipe fitting and adaptor assembly of claim 1, wherein at least one elastomeric sealing member is carried on a peripheral surface of said pipe insert member, said sealing member being configured to engage said receptacle member in sealing relation when at least a portion of said pipe insert member is received within said receptacle member.

6. The pipe fitting and adaptor assembly of claim 1, wherein said adaptor coupling member includes at least one elastomeric sealing member carried on a peripheral surface thereof.

7. The pipe fitting and adaptor assembly of claim 1, wherein a catch is formed on an interior surface of a sidewall of said receptacle member for engagement by said retention member when at least a portion of said pipe insert member is received within said receptacle member.

8. The pipe fitting and adaptor assembly of claim 7, wherein said catch is comprised of a recess formed in the sidewall of said receptacle member.

9. The pipe fitting and adaptor assembly of claim 7, wherein said catch is comprised of an opening extending completely through the sidewall of said receptacle member.

10. The pipe fitting and adaptor assembly of claim 9, wherein said retention member is constructed to slide along a ramped section of said pipe insert member and expand into said opening in the sidewall of said receptacle member to interlock said pipe insert member and said receptacle member together.

11. The pipe fitting and adaptor assembly of claim 7, wherein an access opening is provided in the sidewall of said receptacle member through which said retention member may be accessed for release, so as to unlock said receptacle member from said pipe insert member.

12. The pipe fitting and adaptor assembly of claim 1, including a rotation inhibiting mechanism for preventing rotation of said adaptor receptacle relative to said pipe insert member.

13. The pipe fitting and adaptor assembly of claim 12, wherein said adaptor receptacle is axially shiftable relative to said pipe insert member to release said rotation inhibiting mechanism.

14. A pipe fitting and adaptor assembly, comprising:
an adaptor receptacle member;
a pipe fitting having a pipe insert member, which is connectable to said adaptor receptacle member, said pipe insert member carrying a movable retention member apart from said adaptor receptacle member which extends about a periphery of said pipe insert member;
said adaptor receptacle member having an open end for receiving at least a portion of said pipe insert member and said retention member therein, said receptacle member including a catch formed on an inner surface of a sidewall of said receptacle member for engagement by said retention member when at least a portion of said pipe insert member is received within said receptacle member;
an adaptor coupling member connected to said receptacle member, said adaptor coupling member being configured as a coupling-pipe insert with a movable retainer for connection to an end portion of a pipe that is incompatible for connection to said pipe insert member; and
an access formed in the sidewall of said receptacle member, said access providing accessibility to said retention member to facilitate disengagement of said retention member from said catch when desired.

15. The pipe fitting and adaptor assembly of claim 14, wherein said catch is comprised of a recess formed in the sidewall of said receptacle member.

16. The pipe fitting and adaptor assembly of claim 15, wherein said recess extends completely through the sidewall of said receptacle member.

17. The pipe fitting and adaptor assembly of claim 14, wherein said retention member is comprised of a slidable sleeve member that extends at least partially around a ramped portion of said pipe insert member.

18. The pipe fitting and adaptor assembly of claim 14, wherein said adaptor coupling member includes at least one elastomeric sealing member carried on a peripheral surface thereof.

19. The pipe fitting and adaptor assembly of claim 14, including a releasable rotation inhibiting mechanism for preventing rotation of said adaptor receptacle relative to said pipe insert member.

20. The pipe fitting and adaptor assembly of claim 19, wherein said adaptor receptacle is axially shiftable relative to said pipe insert member to release said rotation inhibiting mechanism.

21. A method of adapting a pipe fitting for connection to an incompatible section of pipe, comprising the steps of:
providing a pipe fitting adaptor assembly having a tubular receptacle member to which an adaptor coupling member is integrally connected, said adaptor coupling being configured as a coupling-pipe insert with a movable retainer for connection to the incompatible section of pipe;
providing a pipe fitting having a pipe insert member to which a substantially annular-shaped retention member is movably carried apart from said adaptor assembly;
inserting at least a portion of said pipe insert member and said retention member into said receptacle member such that said retention member engages in locking relation a catch formed on an inner surface of a sidewall of said receptacle member; and
providing an access through the sidewall of said receptacle member to facilitate dislodgement of said retention member.

22. The method of adapting a pipe fitting in claim 21, including the step of applying pressure to an inner surface of the incompatible section of pipe with a retention member carried by said adaptor coupling member in response to a force tending to separate the incompatible section of pipe from said adaptor coupling member.

23. A pipe fitting and adaptor assembly, comprising:
a pipe fitting having a non-threaded pipe insert member;
an adaptor receptacle member having an open end for receiving at least a portion of said pipe insert member therein, said receptacle member being configured for connection in fluid communication with said pipe insert member of said pipe fitting;
an adaptor coupling member connected in fluid communication and formed integrally with said receptacle member, said adaptor coupling member being configured for connection to an end portion of a pipe that is incompatible for connection to said pipe insert member;
a retention member disposed between and interlocking said pipe insert member and said receptacle member together when at least a portion of said pipe insert member is received within said receptacle member, said retention member being movably carried by said pipe insert member apart from said receptacle member and being movably relative to said pipe insert member and said receptacle member; and
said pipe insert member including a ramp section, and said retention member being comprised of a sleeve carried by said pipe insert member and moveable relative thereto generally along said ramp section.

24. A pipe fitting and adaptor assembly, comprising:
a pipe fitting having a non-threaded pipe insert member;
an adaptor receptacle member having an open end for receiving at least a portion of said pipe insert member therein, said receptacle member being configured for connection in fluid communication with said pipe insert member of said pipe fitting;
an adaptor coupling member connected in fluid communication and formed integrally with said receptacle member, said adaptor coupling member being configured for connection to an end portion of a pipe that is incompatible for connection to said pipe insert member;

a retention member disposed between and interlocking said pipe insert member and said receptacle member together when at least a portion of said pipe insert member is received within said receptacle member, said retention member being movably carried by said pipe insert member apart from said receptacle member and being moveable relative to said pipe insert member and said receptacle member; and a rotation inhibiting mechanism for preventing rotation of said adaptor receptacle member relative to said pipe insert member.

\* \* \* \* \*